US009799469B2

(12) United States Patent  (10) Patent No.: US 9,799,469 B2
Bailey et al.  (45) Date of Patent: Oct. 24, 2017

(54) REMOTE CONTROLLED LIGHT SWITCH COVER ASSEMBLY

(71) Applicant: Ecolink Intelligent Technology, Inc., Carlsbad, CA (US)

(72) Inventors: Michael Bailey, Carlsbad, CA (US); Eric Wang, Tainan (TW); Jerry Huang, Tainan (TW)

(73) Assignee: Ecolink Intelligent Technology, Inc., Carlsbad, CA (US)

( * ) Notice: Subject to any disclaimer, the term of this patent is extended or adjusted under 35 U.S.C. 154(b) by 247 days.

(21) Appl. No.: 14/825,117

(22) Filed: Aug. 12, 2015

(65) Prior Publication Data

US 2016/0049267 A1  Feb. 18, 2016

Related U.S. Application Data

(60) Provisional application No. 62/036,581, filed on Aug. 12, 2014.

(51) Int. Cl.
  *H01H 3/04*  (2006.01)
  *H01H 23/04*  (2006.01)
  *H01H 23/14*  (2006.01)

(52) U.S. Cl.
  CPC .......... *H01H 23/04* (2013.01); *H01H 23/145* (2013.01); *H01H 2300/03* (2013.01); *Y02B 90/224* (2013.01); *Y04S 20/14* (2013.01)

(58) Field of Classification Search
  USPC ..... 307/140, 116, 141.4, 143; 200/529, 553, 200/564, 570, 6 A, 6 R
  See application file for complete search history.

(56) References Cited

U.S. PATENT DOCUMENTS

| 4,912,376 | A | 3/1990 | Strick |
| 5,693,923 | A | 12/1997 | Gula et al. |
| 5,955,796 | A | 9/1999 | Nilssen |
| 8,084,700 | B1 | 12/2011 | Massaro et al. |
| 8,669,484 | B1* | 3/2014 | Benson .................... H01H 3/26 200/38 R |
| 2005/0082150 | A1 | 4/2005 | Gray, Jr. |

(Continued)

OTHER PUBLICATIONS

ISA/US, International Search Report and Written Opinion issued on PCT application No. US16/66964, dated Mar. 27, 2017, 11 pages.

*Primary Examiner* — An Luu
(74) *Attorney, Agent, or Firm* — Greenberg Traurig, LLP

(57) ABSTRACT

A remote controlled light switch cover assembly is described for converting a standard rocker switch into a remote controlled switch. In one embodiment, a method is described, performed by the remote controlled light switch cover, comprising receiving a wireless signal to actuate the standard rocker switch, activating an electric motor that causes a wiper to move along a surface of the standard rocker switch, detecting when the wiper has actuated the standard rocker switch, causing the electric motor to rotate in a reverse direction from the first direction, which causes the wiper to move back towards a valley of the standard rocker switch, detecting when the wiper is positioned over the valley, and in response to detecting when the wiper is positioned over the valley, causing the electric motor to stop rotating, causing the wiper to remain positioned over the valley.

19 Claims, 8 Drawing Sheets

(56) References Cited

U.S. PATENT DOCUMENTS

| | | | |
|---|---|---|---|
| 2005/0194243 A1* | 9/2005 | Prineppi | H01H 3/26 200/556 |
| 2009/0288937 A1 | 11/2009 | Agronin et al. | |
| 2012/0292174 A1 | 11/2012 | Mah et al. | |
| 2013/0342029 A1 | 12/2013 | Mans | |
| 2015/0228426 A1 | 8/2015 | Romano et al. | |

* cited by examiner

REMOTE CONTROLLED LIGHT SWITCH COVER ASSEMBLY

CROSS-REFERENCE TO RELATED APPLICATIONS

The present application claims the benefit of U.S. Provisional Application No. 62/036,581, filed on Aug. 12, 2014, the entirety of which is incorporated by reference herein.

BACKGROUND

I. Field of Use

The present application relates generally to the home automation and control arts. More specifically, embodiments of the present invention relate to remote controlled lighting.

II. Description of the Related Art

Home automation and control has been gaining popularity in recent years, allowing homeowners to remotely monitor and control various devices in their home. For example, the Nest thermostat has revolutionized the home thermostat market by intelligently learning the usage habits of home occupants, while also allowing remote control of the thermostat via the Internet. Wi-Fi enabled light bulbs are becoming increasingly common, allowing remote control of lights. A variety of other remote control devices are available, including devices that open/close garage doors, turn on/off pool/spa equipment, turn on/off sprinkler systems, etc.

The popularity of being able to control lighting is of particular interest to many consumers. However, it is generally necessary to purchase expensive equipment to enable such a feature, such as expensive Wi-Fi capable light bulbs, or Wi-Fi enabled light switches. Such Wi-Fi enabled light switches typically require replacement of an entire light switch, which many homeowners are incapable or simply unwilling to perform such re-wiring.

It would be desirable, therefore, to allow homeowners to remotely control their home lighting without having to purchase expensive lighting equipment or having to replace entire light switches.

SUMMARY

The embodiments described herein relate to apparatus, systems, and methods for converting a standard rocker switch into a remote controlled rocker switch. In one embodiment, a light switch cover is described, comprising a wiper for engagement with a surface of the standard rocker switch and for causing actuation of the standard rocker switch as the wiper is moved across the surface of the standard rocker switch, a gear train coupled to the wiper that causes the wiper to move across the surface of the standard rocker switch, an electric motor, coupled to the gear train, for driving the gear train in a first direction to move the wiper in a first wiper direction, and for driving the gear train in a second direction to move the wiper in a second wiper direction, motor driving circuitry coupled to the electric motor, a wireless receiver for receiving wireless signals that cause the actuation of the standard rocker switch, and processing circuitry coupled to the wireless receiver and the motor driving circuitry that causes the processing circuitry to control the electric motor in accordance with the wireless signals received by the receiver.

In another embodiment, a method for converting a standard rocker switch into a remote controlled rocker switch is described, comprising receiving a wireless signal to actuate the standard rocker switch, in response to receiving the wireless signal, activating an electric motor that causes a gear train to turn in a first direction, which in turn causes a wiper to move along a surface of the standard rocker switch, detecting when the wiper has actuated the standard rocker switch, in response to detecting when the wiper has actuated the standard rocker switch, causing the electric motor to rotate in a reverse direction from the first direction, which causes the wiper to move back towards a valley of the standard rocker switch, detecting when the wiper is positioned over the valley, and in response to detecting when the wiper is positioned over the valley, causing the electric motor to stop rotating, causing the wiper to remain positioned over the valley.

BRIEF DESCRIPTION OF THE DRAWINGS

The features, advantages, and objects of the present invention will become more apparent from the detailed description as set forth below, when taken in conjunction with the drawings in which like referenced characters identify correspondingly throughout, and wherein.

DETAILED DESCRIPTION

Embodiments of the present invention allow a conventional light switch to be converted into a remote-controlled light switch simply and economically. In one embodiment, a conventional rocker switch is converted into a remote-controlled light switch by simply replacing its switch cover with a switch cover in accordance with the teachings herein.

A remote controlled light switch cover assembly may be used to convert a standard, existing rocker light switch to one that can be controlled remotely, for example wirelessly using a keyfob or by using a smartphone, tablet, or other personal electronic device through via a local gateway device, or via the Internet and a local gateway device, in instances where the controller is located remotely from the rocker switch. In some embodiments, a remote controlled light switch may be controlled via a local security panel or home automation gateway, either alone or in conjunction with the aforementioned wireless devices. In one embodiment, the remote controlled light switch cover assembly is using in conjunction with a standard rocker switch used to apply and remove household AC voltages to electrical devices such as lights, commonly found in millions of homes and businesses worldwide.

Figure 1:
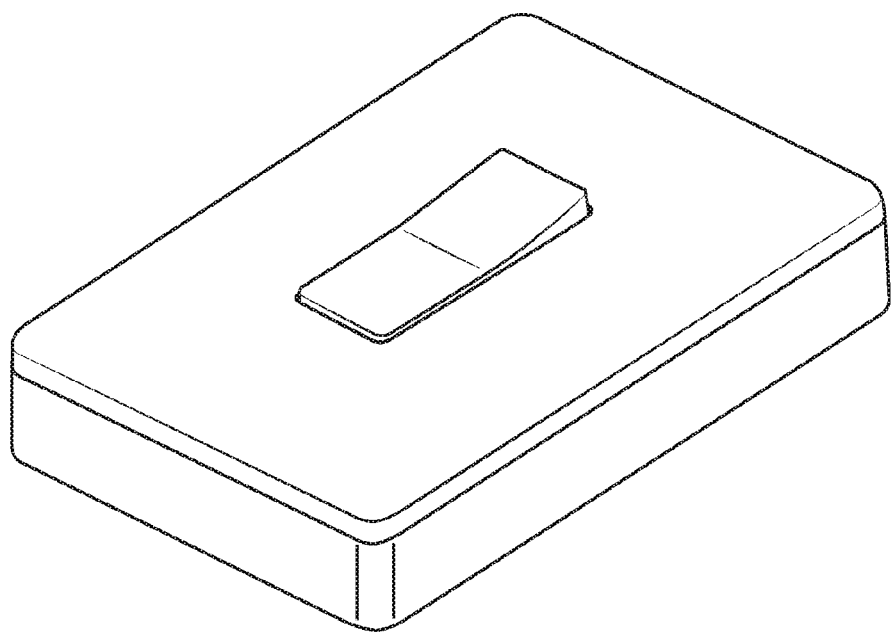
FIG. 1 is a perspective view of one embodiment of a remote controlled light switch cover assembly, for use with a standard rocker switch.

FIG. 1 is a perspective view of one embodiment of a remote controlled light switch cover assembly, for use with a standard rocker switch. The remote controlled light switch cover assembly in one embodiment is approximately 28 millimeters thick, 78 millimeters wide, and 120 millimeters long, as shown. It is designed to be placed over an existing rocker switch after its switch cover has been removed. This allows an easy retrofit to convert an existing rocker switch into a remote-controlled rocker switch, while still allowing the existing rocker switch to be operated manually.

Figure 2:
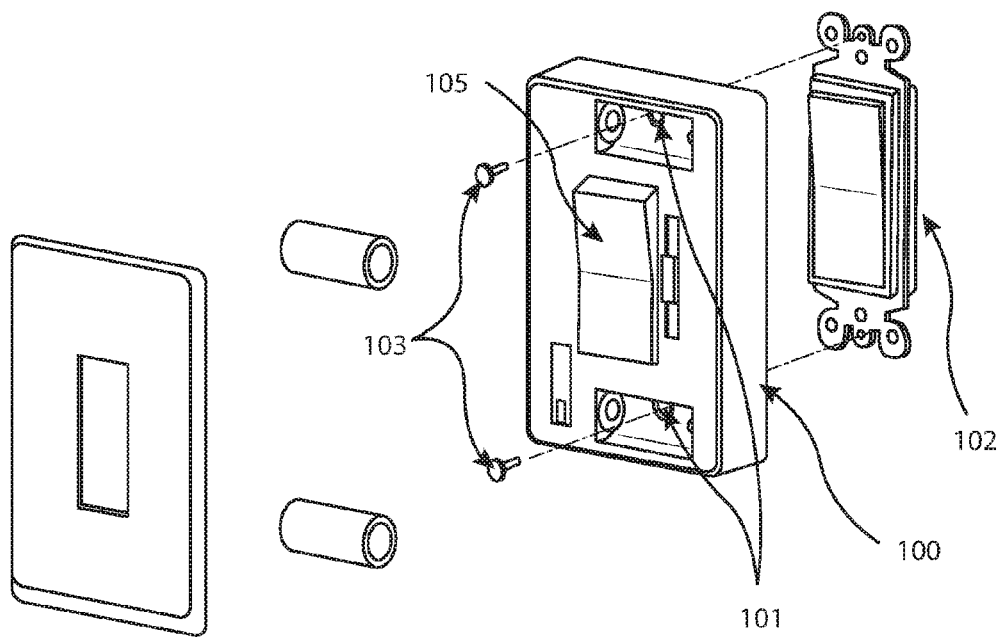
FIG. 2 shows an exploded view of one embodiment of the remote controlled light switch cover assembly of FIG. 1.

FIG. 2 shows an exploded view of one embodiment of the remote controlled light switch cover assembly of FIG. 1. It comprises a main body that holds one or more batteries (in this case 2 batteries) for providing power to electronics located within the main body (not shown), such as such as a receiver for receiving wireless signals to operate the remote controlled light switch, i.e., to move the standard, existing rocker light switch from "on" to "off" or vice versa, one or more visual indicators, such as one or more LEDs, one or more processors, one or more electro-mechanical devices (such as an electric motor) used to manipulate the existing rocker switch, and/or an external rocker switch 105 for manual manipulation of an existing rocker switch. In one embodiment, a dimmer switch may be incorporated into the remote controlled light switch cover assembly, as shown. The main body is installed over an existing rocker switch after its switch cover has been removed. The same switch cover used to cover the existing switch may be used to cover the main body, or a custom cover may be used to fit the dimensions of the main body. In one embodiment, two holes 101 are formed through a surface of the main light switch cover that align with cover mounting threads of a standard rocker switch, and two fastening devices 103, sized and shaped for placement through the two holes, respectively, and for engaging the mounting threads of a standard rocker switch to secure the light switch cover to the standard rocker switch. Installation of light switch cover 100 is as easy as installing batteries into light switch cover 100, and replacing a standard rocker switch cover of an existing rocker switch with light switch cover 100.

Figure 3:
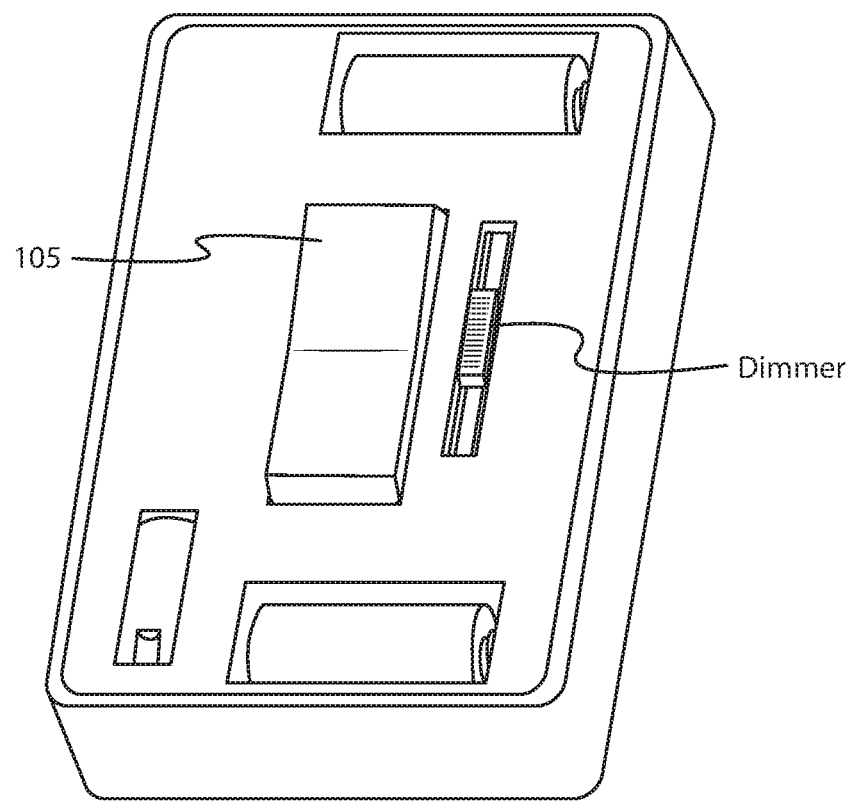
FIG. 3 illustrates the remote controlled light switch cover assembly of FIGS. 1 and 2, installed over an existing rocker switch, with 2 batteries installed.

FIG. 3 illustrates the remote controlled light switch cover assembly of FIGS. 1 and 2, installed over an existing rocker switch, with 2 batteries installed.

Figure 4:
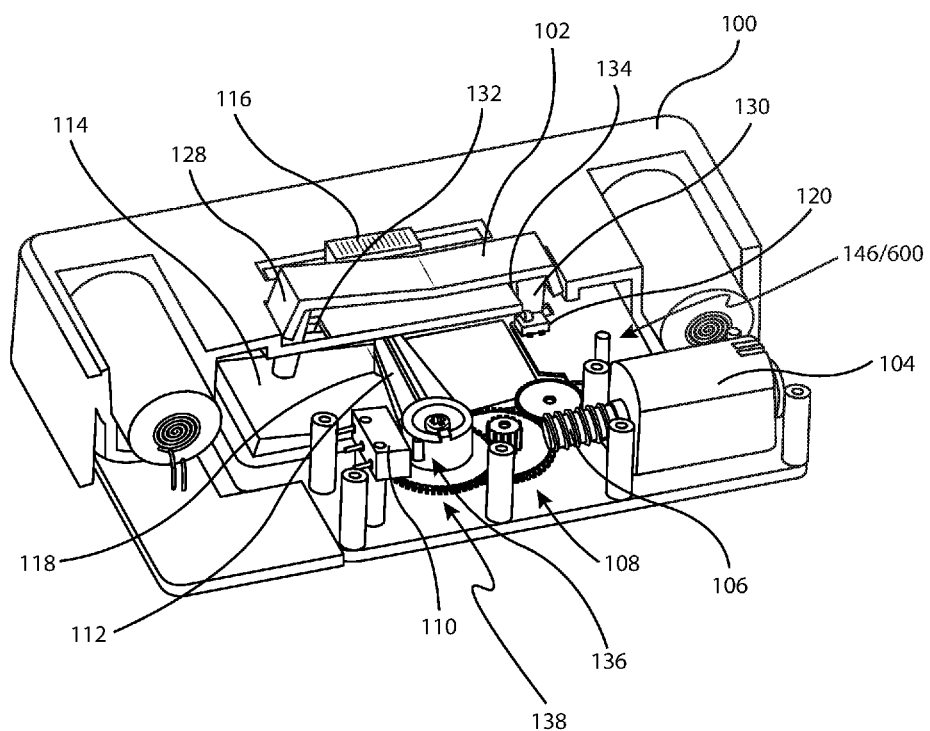
FIG. 4 is a cutaway view of one embodiment of the remote controlled light switch cover assembly of FIGS. 1-3.
Figure 5:
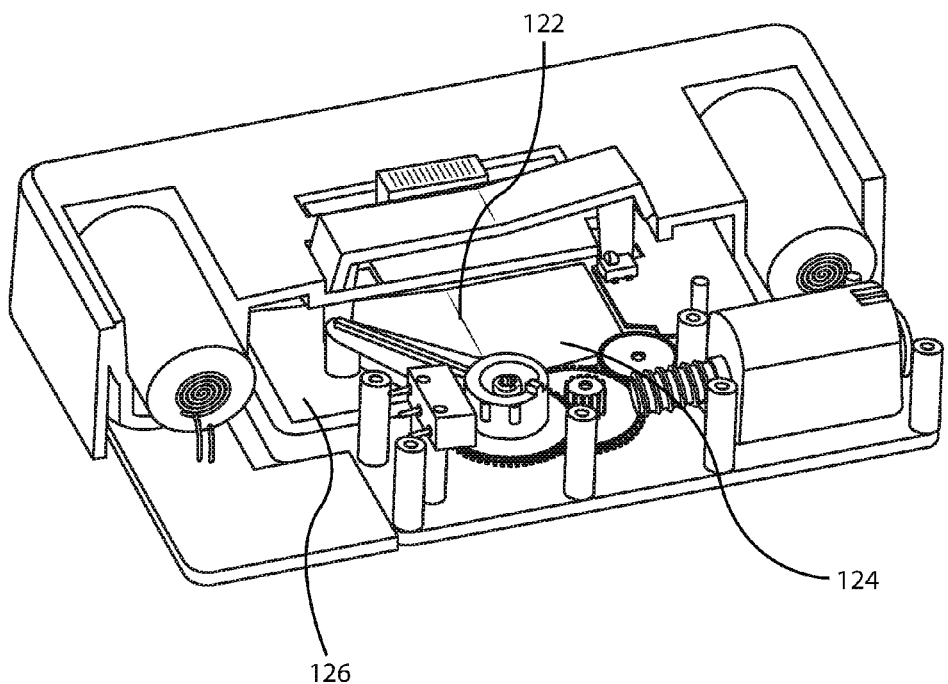
FIG. 5 illustrates a cutaway view the embodiment of the remote controlled light switch cover assembly shown in FIG. 4 with a wiper positioned in either an "on" position or an "off" position.

FIG. 4 is a cutaway view of one embodiment of the remote controlled light switch cover assembly of FIGS. 1-3. Shown is main body 100, standard rocker light switch 102, electric motor 104, driver screw shaft 106, gear train 108, limit switch 110, wiper 112, existing rocker switch 114, dimmer switch 116, wiper extension 118, and second limit switch 120. Not all of these components are necessary in some embodiments.

After the remote controlled light switch cover assembly is installed over existing rocker switch 114, wiper 112 contacts existing rocker switch 114 in the "valley" or crease 122 of existing rocker switch 114, e.g., about the middle of the length of existing rocker switch 114, via wiper extension 118. In one embodiment, wiper extension 118 simply comprises a rigid member extending away from wiper 112 towards existing rocker switch 114. The wiper extension 118 may comprise a tip that is rounded in order to better enable wiper 112 to move along the surface of existing rocker switch 114 as the remote controlled light switch cover assembly is operated remotely. In another embodiment, the wiper extension comprises an encased ball having a portion of the ball protruding from a ball retainer and in contact with the surface of existing rocker switch 114, further reducing the friction created between the surface of existing rocker switch 114 and the wiper extension as the remote controlled light switch cover assembly is operated remotely. In yet another embodiment, wiper extension 118 comprises a structure that resembles a "rolling pin", aligned horizontally with respect to the length of existing rocker switch 114, thus enabling the wiper 112 to, again, glide easily along the surface of existing rocker switch 114 as the remote controlled light switch cover assembly is operated remotely. Other structures that reduce the friction created between the surface of existing rocker switch 114 and the wiper extension as the remote controlled light switch cover assembly is operated remotely could be used in alternative embodiments.

Figure 7:
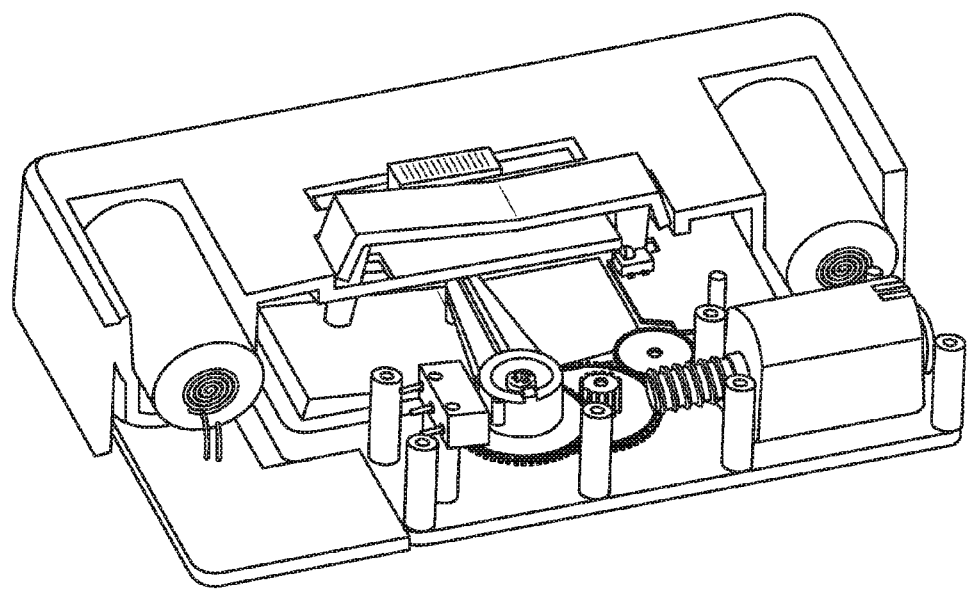
FIG. 7 is a cutaway view the embodiment of the remote controlled light switch cover assembly shown in FIG. 4 with the wiper in a "valley" position.

One of the benefits of the remote controlled light switch cover assembly is the ability to allow manual manipulation of existing rocker switch 114 by a user. As shown in FIG. 7, when the remote controlled light switch cover assembly is not active, e.g., when wiper 112/extension 118 is not moving, wiper 112 and wiper extension 118 are positioned in a "neutral position" approximately mid-way along the length of existing rocker switch, resting against the surface of existing rocker switch 114 in a "valley" or crease 122 formed horizontally across existing rocker switch 114 by the intersection of upper portion 124 and lower portion 126 of the existing rocker switch 114, best shown in FIG. 7. This allows manual manipulation of existing light switch 114 to either "on" position or "off" position without forcing movement of any of the components that comprise the remote controlled light switch cover assembly. For example, neither the wiper 112 nor the wiper extension 118 are moved significantly when the standard rocker light switch 102 is manually manipulated, causing existing rocker switch 114 to be moved to either the "on" position or the "off" position. When the remote controlled light switch cover assembly is operated remotely, the wiper 112 rotates in one direction or the other until either the existing rocker switch 114 is physically switched by the wiper 112 into a new position (i.e., either in the "up" or "down" position) or until a limit switch has been activated, indicating an end to the desired travel limitation of the wiper. Then, the wiper 112 is returned to valley 112 typically by applying a signal from the circuitry to the motor, reversing direction of the wiper 112 until it reaches the valley 112. This may be determined by another limit switch or by some other mechanism.

Referring back to FIG. 4, the remote controlled light switch cover assembly is shown as the remote controlled light switch cover assembly is in a "quiescent" state, i.e., wiper/wiper extension not moving. During this time, the existing rocker switch 114 may be manually manipulated to the "on" or "off" state as a user manually manipulates standard rocker light switch 102, as described above. The standard rocker light switch 102 contacts existing rocker switch 114 via a lower extension 128 and an upper extension 130 extending through the surface of main body 100 through openings 132 and 134, respectively.

Remote operation of the remote controlled light switch cover assembly occurs when a user wishes to remotely manipulate the existing rocker switch 114 to turn lights on or off for example, using a device which sends wireless signals to a receiver located within main body 100, such as a keyfob, smartphone, tablet, home automation gateway, security panel, etc. The receiver receives wireless or wired signals from the device and provides them to circuitry that controls motion of the wiper/wiper extension in order to manipulate the existing rocker switch to the "on" or "off"

state. For example, when a command is received from a remote device instructing the remote controlled light switch cover assembly to turn lights on, the receiver receives the wireless signal from the device and provides a downconverted baseband signal to circuitry, such as a processor and/or discreet components such as one or more transistors, capacitors, resistors, etc. The circuitry then provides a signal to electric motor 104, typically a low-power DC motor, which causes it to rotate in one direction, which in turn causes driver screw shaft 106 to turn in one direction. Driver screw shaft 106 is in mechanical communication with gear train 108, which comprises a gear ratio that effectively reduces the speed of electric motor to a lower speed for use by wiper 112. Gear train 108 is in mechanical communication with wiper 112, which causes wiper 112 to rotate about an axis, in turn causing wiper extension 118 to move in a direction across, in this embodiment, the upper surface 124 of existing rocker switch 114. In doing so, wiper extension 118 exerts a force against the upper surface 124, thereby causing it to be moved in a downward direction, resulting in the existing rocker switch 114 to be placed into the "on" position. After the existing rocker switch 114 to be placed into the "on" position, or has otherwise reached a desired limit of travel, the circuitry causes the motor to rotate in the opposite direction, causing wiper 112 to rotate in the opposite direction until wiper extension 118 is moved back to the valley 122.

Determination of when the existing rocker switch has been placed into the "on" position may be accomplished in a number of different ways. In one embodiment, one or more deformities 136, for example knobs or cams, are used in conjunction with limit switch 110. These deformities are located on a circular portion or "ring" 144 of wiper 112 at such points to coincide with a desired limit of movement of wiper 112. In another embodiment, one or more deformities may be located on collar 142 in embodiments where the wiper, for example, is directly attached to collar 142 without the use of ring 144. The circular portion of the wiper is coupled to a driver gear 138 that is part of drive train 108, and the wiper rotates about a pivot point 140 of driver gear 138 upon actuation. The driver gear comprises an outer, toothed circumference for engagement with the rest of driver train 108, and a collar 142 for engagement with the circular portion of wiper 112. As driver gear 138 rotates in one direction, the deformities are rotated as well, causing them to either make contact, or not, with a contact of limit switch 110. When contact/no contact is made, limit switch 110 causes a signal to be provided to the circuitry indicating that wiper 112 has reached the desired limit of movement. In response, the circuitry provides a signal to electric motor 104, causing the electric motor 104 to rotate in an opposite direction, thereby returning wiper extension 118 to valley 122.

The deformities and switch 110 may alternatively or additionally be used to detect when wiper 112 has been moved back over valley 122 after wiper 112 has turned the existing rocker switch on or off. In one embodiment, three deformities can be positioned around collar 142, each one causing switch 110 to change state as the wiper is positioned in the "on", "off", or "valley" state (i.e., positioned over valley 122). Alternatively, other sensing techniques may be used to determine when viper 112 is in the valley position, such as by the circuitry determining a number of revolutions of motor 104 and/or any of the gears comprising gear train 108 as the wiper is moved to either the "on" position or "off" position, then rotating motor 104/gear train 108 an equal amount in the opposite direction.

In another embodiment, second limit switch 120 is used in conjunction with either lower extension 128, upper extension 130 or both to determine when the existing rocker switch 114 is in the "on" position or has otherwise reached a desired limit of travel. In the embodiment shown in FIG. 4, a single second limit 120 switch is used (limit switch 110 is not used in this embodiment, or it may be used in conjunction with second limit switch 120). When existing rocker switch 114 moves to the "on" position, lower portion 126 moves upward, causing lower extension 128 to also move upward. As this occurs, upper extension 130 pivots in a downward direction, with the end of extension 130 coming into physical contact with the second limit switch 120. When this occurs, second limit switch 120 causes a signal to be provided to the circuitry indicating that wiper 112 has reached the desired limit of movement or that the existing rocker switch is in the "on" position. In response, the circuitry provides a signal to electric motor 104, causing the electric motor 104 to rotate in an opposite direction, thereby returning wiper extension 118 to valley 122.

Similarly, when a remote command to turn the existing rocker switch "off" is received by the receiver, it receives a wired or wireless signal from the device and provides a down-converted baseband signal to the circuitry, which then provides a signal to electric motor 104 causing it to rotate in an opposite direction from the direction used when turning the existing rocker switch 114 "on". This causes driver screw shaft 106 to turn, thereby causing gear train 108 to turn, which causes wiper extension 118 to move in a direction across, in this embodiment, the lower surface 126 of existing rocker switch 114. In doing so, wiper extension 118 exerts a force against the lower surface 126, thereby causing it to be moved in a downward direction, resulting in the existing rocker switch 114 to be placed into the "off" position. After the existing rocker switch 114 to be placed into the "off" position, the circuitry causes the motor to rotate in the opposite direction, causing wiper 112 to rotate in the opposite direction until wiper extension 118 is moved back to the valley 122.

Determination of when the existing rocker switch has been placed into the "off" position may be accomplished in a number of different ways, as discussed above.

The remote controlled light switch cover assembly may additionally comprise a way to transmit information to a remote location, such as a home security panel, home automation system, smartphone, tablet, or some other device. The type of information that may be transmitted may comprise the state of existing rocker switch 114 (e.g., "on" or "off"), battery status (e.g., warning signal sent when battery is low), supervisory signal to indicate the presence and operational confirmation of the remote controlled light switch cover assembly, and/or a signal indicative of detected movement, e.g., by a motion sensor (not shown) optionally integrated into the remote controlled light switch cover assembly. In this embodiment, the circuitry may provide information for transmission to a transmitter located within main body 100. In another embodiment, the transceiver is part of a transceiver/receiver combination, such as one of a variety of transceivers widely available in the marketplace today. Further, the circuitry may provide one or more types of information periodically, such as once per hour, or upon receipt of a command from a remote device to provide one or more types of information.

When used in conjunction with a motion sensor, for example an integrated PIR detector, the remote controlled light switch cover assembly may automatically turns lights on or off when people enter or leave a room. When the motion sensor detects movement, indicative of activity in a room, the motion sensor may provide a signal to the circuitry, indicative of such. In response, the circuitry may cause electronic motor to rotate in order to place existing rocker switch 114 into the "on" position. Similarly, if the motion sensor does not detect movement in the room for more than a predetermined time period, such as 10 minutes, the circuitry may cause the electric motor to rotate to turn the existing rocker switch to the "off" position.

In a related embodiment, the remote controlled light switch cover assembly may turn existing rocker switch 114 on or off as a result of receiving a signal from a remote device, indicative of when activity is detected in a room. For example, a stand-alone motion sensor could sense motion in a room, and then report that finding to a home security panel. The home security panel might then transmit a command to the remote controlled light switch cover assembly to turn the existing rocker switch to the "on" position. In one embodiment, the stand-alone motion sensor is located in one room (such as a foyer) and the remote controlled light switch cover assembly located in another room, such as a living room, so that when the motion sensor detects movement, the home security panel can send a signal to the remote controlled light switch cover assembly in the living room, so that the living room is lit, for example, when a person enters his/her home.

In another embodiment, a remote controlled light switch cover assembly could be used in conjunction with a typical, manually operated light switch, such as in an application where hallway lighting is controlled by two switches, one located at each end of the hallway. This may be referred to by those skilled in the art as a "three-way circuit". In this embodiment, the remote controlled light switch cover assembly could transmit a status signal to a remote device such as a home security panel, home automation system, or internet gateway, with a light status of whether the hall light is "on" or "off". Such a determination may be made using a current-sensing device, such as a coil, integrated circuit, and/or other circuitry to sense current flowing through existing rocker switch 114. In one embodiment, an on/off status signal is transmitted to a device upon detection of a change of state, i.e., a change of the light illumination from "on" to "off" or vice-versa. The state change may be detected by storing the last known mechanical position of the standard rocker light switch 102 wipe direction of wiper 112. A storage device, such as an electronic memory, flip-flop, or discrete circuitry can be used to store the state of the external rocker switch 105, e.g., either "up" or "down". The same storage device, or a different one, may store the light status as well using the current sensor. Thus, at any time, the remote controlled light switch cover assembly knows which position the external rocker switch 105 is in currently and whether the light is on or off. Then, if a command is received to either turn the light on or off from the device, the circuitry can determine whether the wiper 112 must be activated and, if so, what direction to wipe, depending on whether the command is to turn the light on or off For example, in a three-way application that uses a regular switch and a remote controlled light switch cover assembly, if the remote controlled light switch cover assemblies is in an "up" position, i.e., upper portion 124 pushed towards main body 100, and the current sensor determines that current is flowing through the existing rocker switch, an indication is stored within the memory(ies), indicating that the existing rocker switch 114 is in the "up" position and that the light is on. Thereafter, if the regular light switch is manipulated, turning the light off, the current sensor detects the loss of current, and the circuitry stores the current status of the light, i.e., "off" in the memory. Then, if a command is received by the remote controlled light switch cover assembly to turn the light on, the circuitry will determine the present light status and know that the light is off, and that the existing rocker switch is in the "up" position. Knowing this, the circuitry provides a signal to the electric motor 104 to turn the motor shaft in a way that will turn wiper 112 in a direction to place the existing rocker switch 114 into an opposite state, in this example, in the "down" state.

Figure 6:
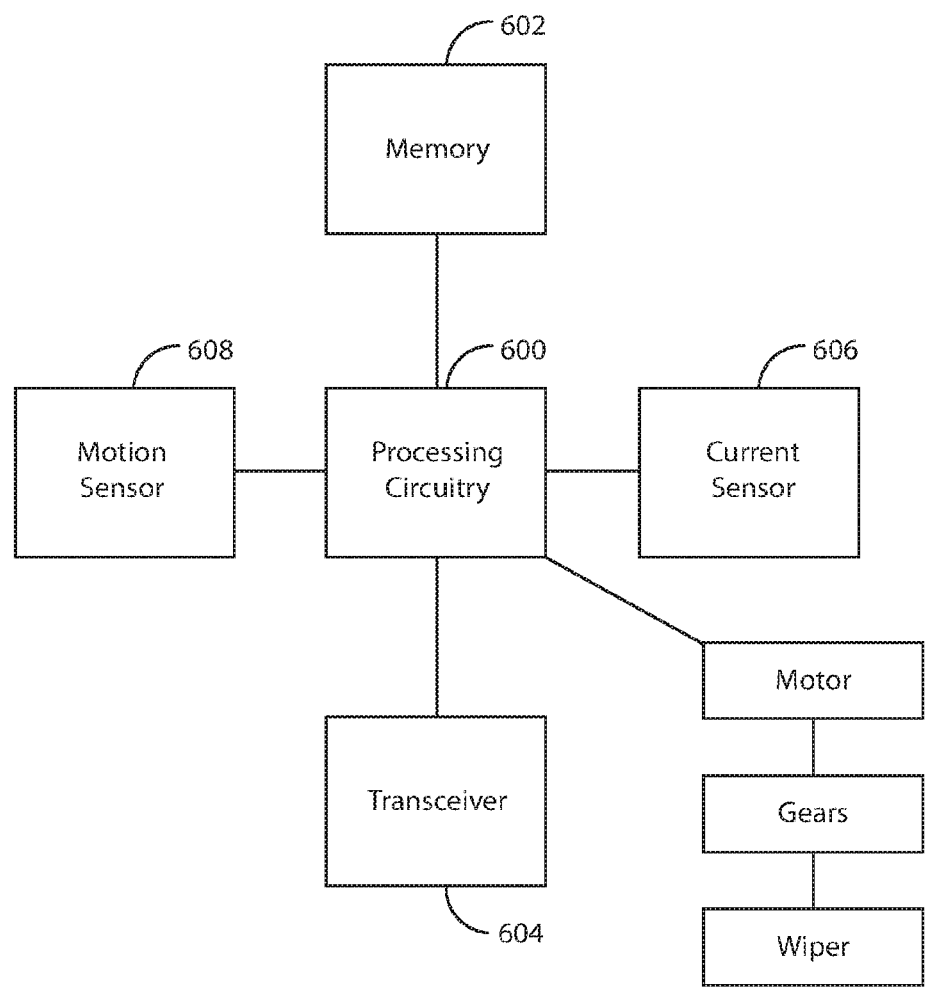
FIG. 6 illustrates a functional block diagram of one embodiment of a remote controlled light switch cover assembly.

FIG. 6 illustrates a functional block diagram of one embodiment of a remote controlled light switch cover assembly, shown comprising processing circuitry 600, memory 602, transceiver 604, electric motor 104, gear train 108, wiper 112, current sensor 606, motion sensor 608, and motor driving circuitry 146. It should be understood that in some embodiments, not all of the functional blocks shown in FIG. 6 are necessary for the proper operation of the remote controlled light switch cover assembly and that some functionality has been omitted for purposes of clarity.

The processing circuitry 600 comprises a general-purpose microprocessor, microcontroller well known in the art and/or a custom or semi-custom ASIC, and/or discrete components able to carry out the functionality required for operation of the remote controlled light switch cover assembly. Processing circuitry 600 is selected based on power-consumption properties and space considerations, as the remote controlled light switch cover assembly typically operates on batteries and a small form factor is desirable. In the case of a microprocessor, microcontroller, or ASIC, processing circuitry 600 generally executes processor-executable instructions stored in one or more memories 602 that control the functionality of the remote controlled light switch cover assembly. Examples of the memory include one or more electronic memories such as RAM, ROM, hard drives, flash memory, EEPROMs, UVPROMs, etc. or virtually any other type of electronic, optical, or mechanical memory device, but excludes propagated signals. Memory 602 could alternatively comprise an integrated circuit, such as a flip-flop, or even discrete components, such as one or more transistors, resistors, capacitors, etc.

Transceiver 604 comprises circuitry necessary to transmit and receive communication signals, including messages, commands, status information, requests, etc., between the remote controlled light switch cover assembly and a remote device, either directly or through a local device such as a gateway, security panel, or home automation panel. Such circuitry is well known in the art and may comprise BlueTooth, Wi-Fi, RF, optical, or ultrasonic circuitry, among others.

Motion sensor 608 comprises any device that is able to detect movement of a person within range of the remote controlled light switch cover assembly. In one embodiment, a PIR detector is used, although other types of motion sensors may be used in the alternative, keeping the low power requirement of the remote controlled light switch cover assembly in mind. In another embodiment, detector 310 comprises a passive infrared sensor. In other embodiments, motion sensor may comprise a light-beam interruption detector, a sonic transducer, or a reed switch.

Current sensor 606 comprises a device to detect the presence of alternating current that is conducted through existing rocker switch 114. Typically, the current sensor 606 comprises a coil, integrated circuit, and/or discrete components to wirelessly determine changes in flux occurring as a result of a change in current through existing rocker switch 114. Current sensor 606 provides a signal indicative of the current to the processing circuitry 600.

The motor driving circuitry 146 is coupled to processing circuitry 600 and provides one or more relatively high power signals to motor 104 that cause motor 104 to rotate in one direction or the other. Such circuitry is well-known in the art.

FIG. 7 is a perspective view of the light switch cover showing wiper 112 in the "valley" position, positioned over valley 122 of standard rocker switch. In this position, a user may manually operate the standard rocker switch without damaging any components of the light switch cover.

Figure 8:
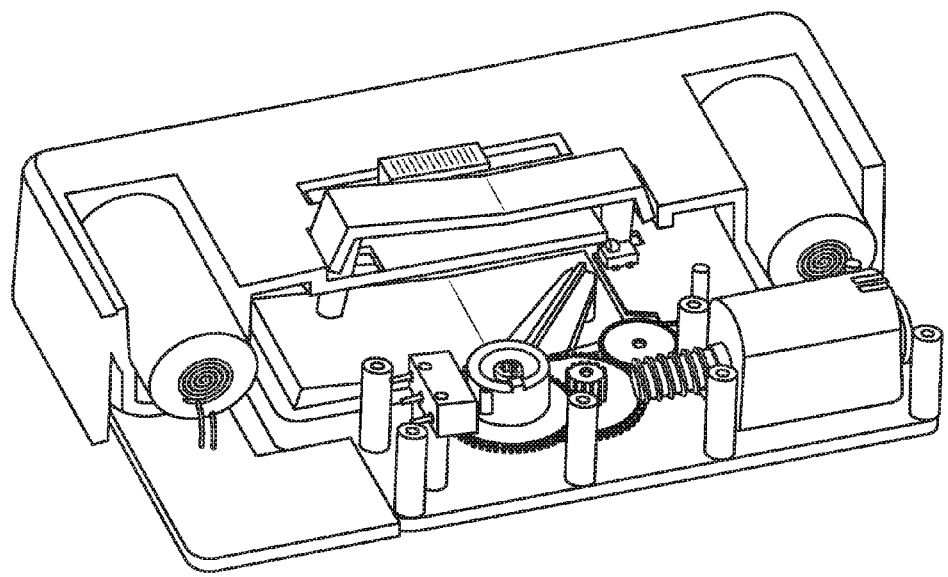
FIG. 8 is a cutaway view the embodiment of the remote controlled light switch cover assembly shown in FIG. 4 with the wiper in an "actuated" position.

FIG. 8 is a perspective view of the light switch cover showing wiper 112 in an "actuated" position, i.e., either in the "on" position or the "off" position, before wiper 112 is moved back to the valley position. Also shown is how switch 110 is actuated as a deformity 136 engages a contact of switch 110 when wiper has reached the position shown in FIG. 8, corresponding to actuation of the standard rocker switch being place in either an "on" or "off" position.

FIG. 9 is a flow diagram of one embodiment of a method for remote control of a standard rocker switch performed by a light switch cover in accordance with the teachings herein.

At block 900, transceiver 604 (or a wireless receiver in an embodiment where a transmitter is not used) receives a wireless signal to actuate the standard rocker switch, to turn lights on or off, for example. The wireless signal may originate from a smart phone, mobile computer, fixed computer, home automation gateway, security system, or some other device known in the art.

At block 902, in response to receiving the wireless signal, processing circuitry 600 activates electric motor 104 that causes gear train 108 to turn in a first direction, commensurate with turning the standard rocker switch to a position indicated by the wireless signal. In practice, processing circuitry 600 provides a signal to motor driving circuitry 610 which in turn provides a power signal to motor 104. This, in turn, causes wiper 112 to rotate about pivot point 140, causing wiper 112 to move along the surface of the standard rocker switch.

At block 904, processing circuitry 600 detects when wiper 112 has actuated the standard rocker switch, i.e., when the standard rocker switch has been placed in either the "on" or "off" position. This detection is performed in accordance with the teachings previously discussed above. This position is best shown in FIG. 8.

At block 906, in response to detecting when the wiper has actuated the standard rocker switch, the processing circuitry causes the electric motor to rotate in a reverse direction (again, by providing a signal to motor driving circuitry 610) from the first direction, which causes wiper 112 to move back towards valley 122 of the standard rocker switch.

At block 908, processing circuitry 600 detects when wiper 112 is positioned over valley 122 of the standard rocker switch. This detection is performed in accordance with the teachings previously discussed above. This position is best shown in FIG. 7.

At block 910, in response to detecting when wiper 112 is positioned over valley 122, processing circuitry 600 causes the electric motor to stop rotating (by sending a signal to motor driving circuitry 610), causing wiper 112 to remain positioned over valley 112.

At block 912, processor may transmit a signal to a remote location, such as a security panel, home automation gateway, smart phone, mobile computing device, etc., indicating the position of the standard rocker switch.

The methods or steps described in connection with the embodiments disclosed herein may be embodied directly in hardware or embodied in machine-readable instructions executed by a processor, or a combination of both. The machine-readable instructions may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. In the alternative, the processor and the storage medium may reside as discrete components.

Accordingly, an embodiment of the invention may comprise a non-transitory processor-readable media embodying code or machine-readable instructions to implement the teachings, methods, processes, algorithms, steps and/or functions disclosed herein.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

We claim:

1. A light switch cover for converting a standard rocker light switch into a remote-controlled light switch, comprising:
    a wiper for engagement with a surface of the standard rocker switch and for causing actuation of the standard rocker switch as the wiper is moved across the surface of the standard rocker switch;
    a gear train coupled to the wiper that causes the wiper to move across the surface of the standard rocker switch;
    an electric motor, coupled to the gear train, for driving the gear train in a first direction to move the wiper in a first wiper direction, and for driving the gear train in a second direction to move the wiper in a second wiper direction;
    motor driving circuitry coupled to the electric motor;
    a wireless receiver for receiving wireless signals that cause the actuation of the standard rocker switch; and
    processing circuitry coupled to the wireless receiver and the motor driving circuitry that causes the processing circuitry to control the electric motor in accordance with the wireless signals received by the receiver.

2. The light switch cover of claim 1, wherein:
    the gear train comprises a driver gear;
    the wiper comprises a tip; and
    the wiper is coupled to the driver gear extending away from the driver gear such that rotation of the driver gear causes the tip of the wiper to rotate about a pivot point of the driver gear in either the first wiper direction or the second wiper direction.

3. The light switch cover of claim 1, wherein the driver gear comprises an outer, toothed circumference and a collar, wherein the wiper is coupled to the collar.

4. The light switch cover of claim 1, wherein the light switch cover further comprises:
    two holes formed through a surface of the light switch cover that align with cover mounting threads of the standard rocker switch; and two fastening devices sized and shaped for placement through the two holes, respectively, and for engaging the mounting threads to secure the light switch cover to the standard rocker switch.

5. The light switch cover of claim 1, further comprising: an external rocker switch having a first extension and a second extension, each extending through a surface of the light switch cover to engage a first portion of the standard rocker switch and a second portion of the standard rocker switch, respectively, as the external rocker switch is operated.

6. The light switch cover of claim 1, further comprising: a switch comprising a first contact that causes a change of state of the switch when the wiper is positioned substantially over a valley of the standard rocker switch.

7. The light switch cover of claim 6, wherein the wiper further comprises an opposing end comprising a ring, the ring having an outer circumference comprising a deformity that activates the first contact when the wiper is moved over the valley of the standard rocker switch, causing the switch to change state.

8. The light switch cover of claim 6, wherein the gear train comprises a driver gear having a collar, the collar having a deformity on a surface of the collar that activates the first contact when the wiper is moved over the valley of the standard rocker switch, causing the switch to change state.

9. The light switch cover of claim 5, further comprising:
a limit switch located beneath the first extension that changes state when the first extension contacts the limit switch as the external rocker switch is operated;
wherein the processing circuitry further:
detects the change of state of the limit switch; and
causes the motor to stop driving the gear train as a result of detecting the change of state of the limit switch.

10. The light switch cover of claim 5, further comprising:
a limit switch located beneath the first extension that changes state when the first extension contacts the limit switch as the external switch is operated;
wherein the processing circuitry further:
causes the electric motor to drive the gear train in the first direction upon receipt of a first wireless signal;
detects the change of state of the limit switch as the first extension contacts the limit switch; and
causes the electric motor to drive the gear train in the second direction as a result of detecting the change of state of the limit switch.

11. The light switch cover of claim 10, further comprising:
a second switch that changes state when the wiper is positioned substantially over a valley of the standard rocker switch;
wherein the processing circuitry further:
detects a change of state of the second switch; and
causes the electronic motor to stop driving the gear train upon detecting the change of state of the second switch.

12. The light switch cover of claim 6, wherein the wiper comprises a ring at one end, the ring coupled to a driver gear, the driver gear having three deformations formed thereon that cause activation of the switch as the wiper is positioned in the "on" position, the "off" position and in a valley position, respectively, the valley position comprising the wiper being positioned over a valley of the standard rocker switch.

13. The light switch cover of claim 1, wherein the wiper comprises a tip, and the tip comprises a socket and a ball held in place by the socket, the ball in contact with the surface of the standard rocker switch.

14. The light switch cover of claim 1, further comprising: a transmitter for transmitting a signal indicative of a state of the standard rocker switch.

15. The light switch cover of claim 1, further comprising:
a transmitter;
wherein the processing circuitry further:
controls the electric motor as a result of receiving a first of the wireless signals;
determine whether or not actuation of the standard rocker switch was successful in response to receiving the first wireless signal; and
transmit a signal indicative of whether or not actuation of the standard rocker switch was successful.

16. The light switch cover of claim 15, further comprising:
means for determining whether or not current is flowing through the standard rocker switch;
wherein the processing circuitry determines whether or not actuation of the standard rocker switch was successful by determining whether the current is flowing through the standard rocker switch as determined by the means for determining whether or not current is flowing through the standard rocker switch.

17. The light switch cover of claim 1, wherein the processing circuitry further:
determines when the standard light switch has been actuated;
in response to determining that the standard light switch has been actuated, causing the electric motor to drive the gear train in a reverse direction to either the first or second direction, causing the wiper to return to position over a valley of the standard rocker switch.

18. The light switch cover of claim 17, wherein the processing circuitry further:
determines when the wiper has moved to a position over the valley; and
stopping the motor from rotating when the processing circuitry has determined that the wiper is positioned over the valley.

19. A method performed by a light switch cover for remote control of a standard rocker switch, comprising:
receiving a wireless signal to actuate the standard rocker switch;
in response to receiving the wireless signal, activating an electric motor that causes a gear train to turn in a first direction, which in turn causes a wiper to move along a surface of the standard rocker switch;
detecting when the wiper has actuated the standard rocker switch;
in response to detecting when the wiper has actuated the standard rocker switch, causing the electric motor to rotate in a reverse direction from the first direction, which causes the wiper to move back towards a valley of the standard rocker switch;
detecting when the wiper is positioned over the valley; and
in response to detecting when the wiper is positioned over the valley, causing the electric motor to stop rotating, causing the wiper to remain positioned over the valley.

* * * * *